(12) United States Patent
Kato

(10) Patent No.: US 11,059,167 B2
(45) Date of Patent: Jul. 13, 2021

(54) MULTI-JOINT ROBOT ARM

(71) Applicant: FUJI CORPORATION, Chiryu (JP)

(72) Inventor: Masaki Kato, Toyota (JP)

(73) Assignee: FUJI CORPORATION, Chiryu (JP)

( * ) Notice: Subject to any disclaimer, the term of this patent is extended or adjusted under 35 U.S.C. 154(b) by 145 days.

(21) Appl. No.: 16/347,304

(22) PCT Filed: Nov. 29, 2016

(86) PCT No.: PCT/JP2016/085417
§ 371 (c)(1),
(2) Date: May 3, 2019

(87) PCT Pub. No.: WO2018/100644
PCT Pub. Date: Jun. 7, 2018

(65) Prior Publication Data
US 2019/0283238 A1 Sep. 19, 2019

(51) Int. Cl.
*B25J 9/06* (2006.01)
*B25J 9/04* (2006.01)
*B25J 17/02* (2006.01)

(52) U.S. Cl.
CPC .............. *B25J 9/06* (2013.01); *B25J 9/042* (2013.01); *B25J 17/0291* (2013.01)

(58) Field of Classification Search
CPC ........ B25J 17/02; B25J 17/0291; B25J 17/00; B25J 18/00

USPC .......................... 74/490.01, 490.05
See application file for complete search history.

(56) References Cited

FOREIGN PATENT DOCUMENTS

| CN | 106625755 A | * | 5/2017 | .............. B25J 18/04 |
| JP | 2010-155300 A | | 7/2010 | |
| WO | WO-2017146404 A1 | * | 8/2017 | .............. B25J 11/00 |

OTHER PUBLICATIONS

International Search Report dated Feb. 14, 2017 in PCT/JP2016/085417 filed on Nov. 29, 2016.

* cited by examiner

*Primary Examiner* — Thomas C Diaz
(74) *Attorney, Agent, or Firm* — Oblon, McClelland, Maier & Neustadt, L.L.P.

(57) ABSTRACT

A multi-joint robot arm including a pair of support sections separated by a specified gap in a width direction; a first arm rotatably supported by a first joint on the pair of support sections and formed from a pair of first side plate members with a level difference such that a gap between the first joint and an end section on an opposite side becomes narrower towards the width direction side; a second arm arranged inside of the pair of first side plate members, rotatably supported by a second joint on the first side plate members, and provided with a level difference such that a gap between the second joint and an end section on the opposite side gets wider towards the width direction side; and a robot hand attached to the second arm on an end portion on the opposite side to the second joint.

3 Claims, 6 Drawing Sheets

MULTI-JOINT ROBOT ARM

TECHNICAL FIELD

The present application relates to a multi-joint robot arm that passes through an opening that is narrow relative to a workpiece.

BACKGROUND ART

A processing machine line configured from multiple processing machines sends a workpiece in order between multiple processing machines arranged in a single line, and specified processing such as machining processing or measurement processing is performed. Patent literature 1 below discloses an automatic workpiece transfer machine for transferring a workpiece between processing machines. Specifically, the machine is a conveyance robot assembled to be movable in front of the processing machines. A conveyance rail is fixed to a front section of a base on which multiple processing machines are loaded, and a traveling table is provided on the conveyance rail in a movable manner, with a multi-joint robot arm that performs transfer of the workpiece being loaded on the traveling table.

CITATION LIST

Patent Literature

Patent literature 1: JP-A-2010-155300

BRIEF SUMMARY

Technical Problem

A multi-joint robot arm of patent literature 1 uses joints to switch to and from a state in which the multiple arms are folded up and a state in which they are extended, but a workpiece that can be grasped by a robot hand at the tip of the arm may be considered to be relatively small. However, a multi-joint robot arm as a conveyance device is for handling various workpieces, and there is a demand to handle large workpieces. On the other hand, in recent years, processing machines are becoming compact, and demands for a multi-joint robot arm to work in a small space are increasing. Also, the conveyance space in which a workpiece is conveyed is also getting smaller, so there is a demand for the multi-joint robot arm itself to be compact.

Thus, to solve the above problems, an object of the present disclosure is to provide a multi-joint robot arm that passes through an opening that is narrow relative to a workpiece.

Solution to Problem

A multi-joint robot arm according to an embodiment of the present disclosure includes: a pair of support sections provided on a base member and separated by a specified gap in a width direction; a first arm rotatably supported by a first joint on the pair of support sections and formed from a pair of first side plate members with a level difference such that a gap between the first joint and an end section on an opposite side becomes narrower towards the width direction side; a second arm arranged inside of the pair of first side plate members, rotatably supported by a second joint on the first side plate members, and provided with a level difference such that a gap between the second joint and an end section on the opposite side gets wider towards the width direction side; and a robot hand attached to the second arm on an end portion on the opposite side to the second joint.

Advantageous Effects

According to the disclosed configuration, because with a first robot arm formed from a pair of first side plate members provided with a level difference, a portion that gets narrower towards the inside in the width direction is inserted inside the processing machine, and with a second arm formed from second side plate members provided inside the first arm, a robot hand is loaded on a portion that gets wider toward the outside in the width direction, it is possible to pass through an opening that is narrow relative to a workpiece.

DESCRIPTION OF EMBODIMENTS

Figure 1:
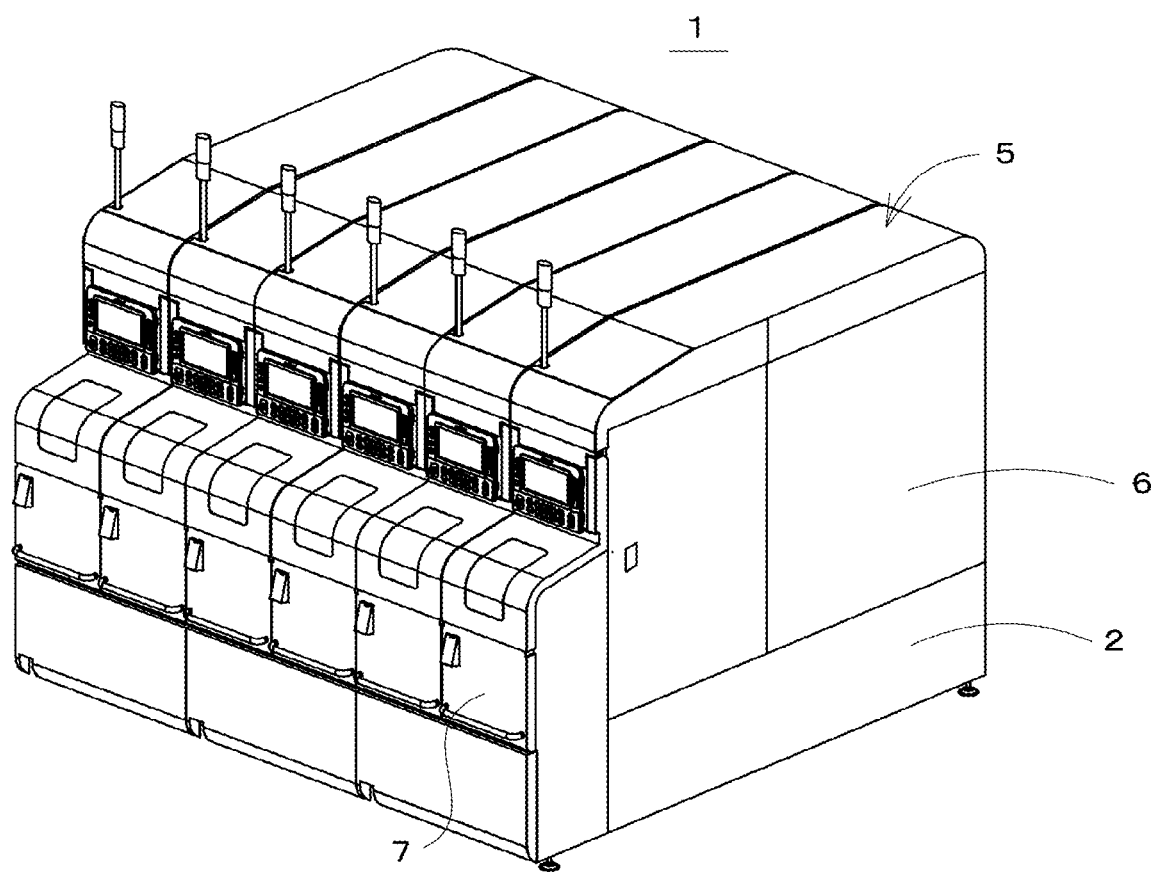
FIG. 1 is a perspective view of a processing machine line.

Hereinafter, an embodiment of the present disclosure of a multi-joint robot arm will be described with reference to the figures. A multi-joint robot arm of the present embodiment configures an automatic workpiece transfer machine for a processing machine line configured from multiple machine tools, and is for transferring a workpiece between each of the machine tools. FIG. 1 is a perspective view of a processing machine line.

As shown in the figure, processing machine line 1 is configured from six machine tools 5 arranged adjacent to each other. With processing machine line 1, processing machines 5 such as modularized lathes (also referred to as "processing modules") are loaded on base 2. Each processing module 5 is manufactured with the same width dimension, and is loaded on base 2 so as to be movable in a front-rear direction via rails. Processing module 5 is a narrow machine tool such that processing machine line 1 configured from processing modules 5 lined up is compact overall.

With processing machine line 1, a specified process is performed on a workpiece at each of the processing modules 5. Thus, an automatic workpiece transfer machine for transferring a workpiece between each processing module 5 is provided in processing machine line 1. Processing module 5 is configured such that various devices are covered by external cover 6, with a processing chamber for performing processing on the workpiece provided inside the external cover 6. Further, a front cover that can be opened and closed is integrated in external cover 6. Front cover 7 is provided for each processing module 5, and the configuration is such that a single conveyance space is provided for the entire processing machine line 1, and the automatic workpiece transfer machine for conveying a workpiece is provided in the conveyance space.

Figure 2:
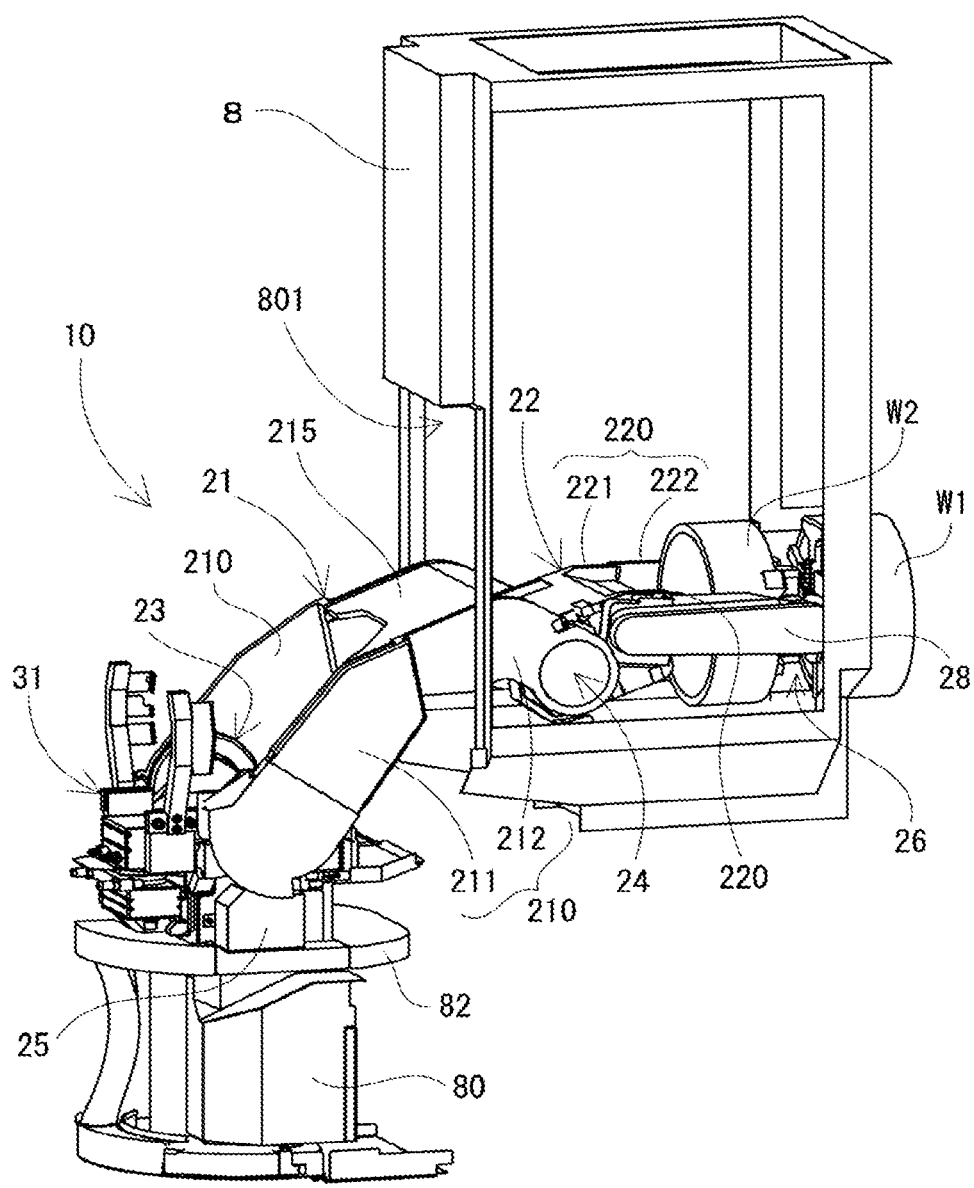
FIG. 2 is a perspective view showing a multi-joint robot arm in an extended state.
Figure 3:
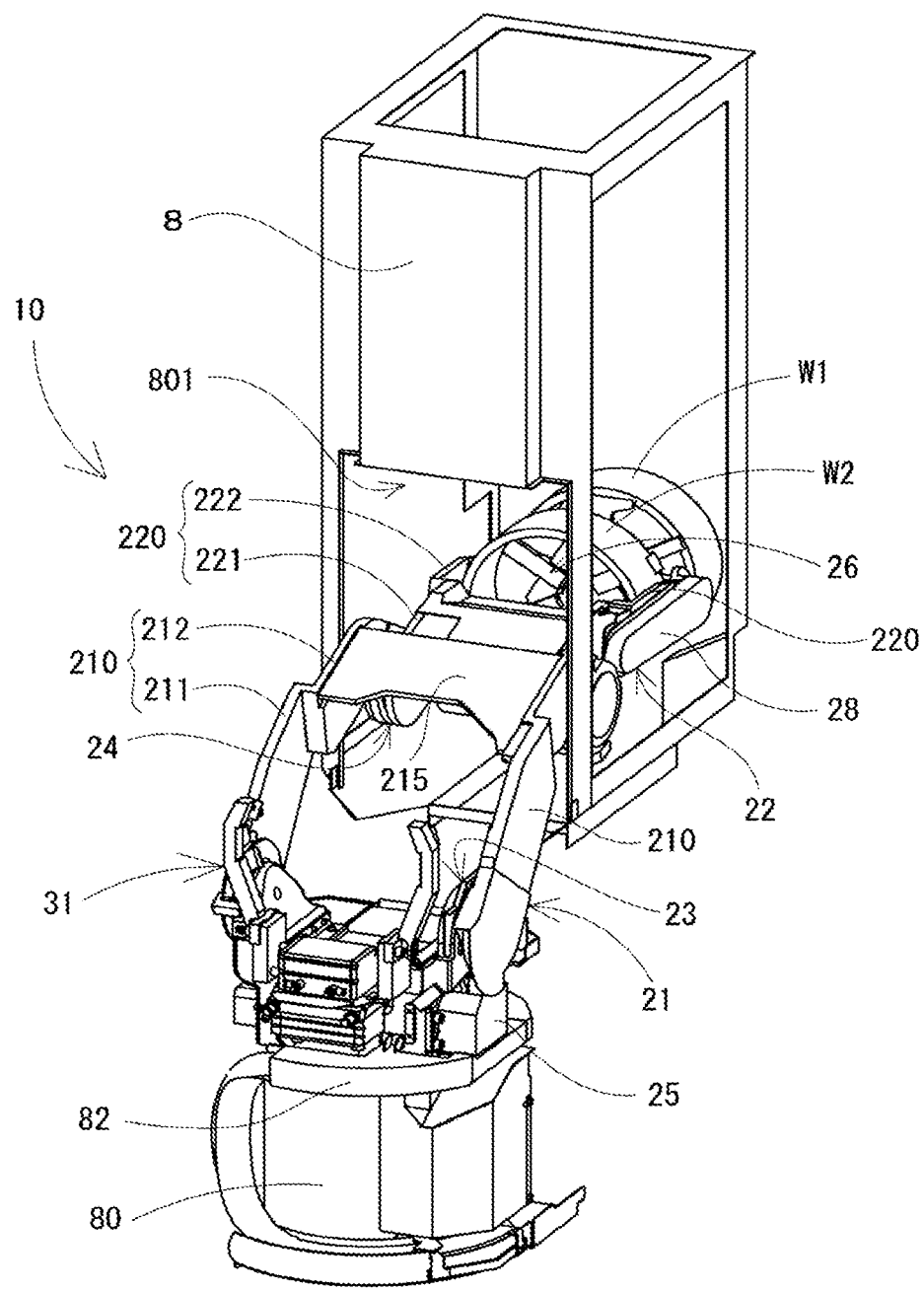
FIG. 3 is a perspective view showing a multi-joint robot arm in an extended state.
Figure 4:
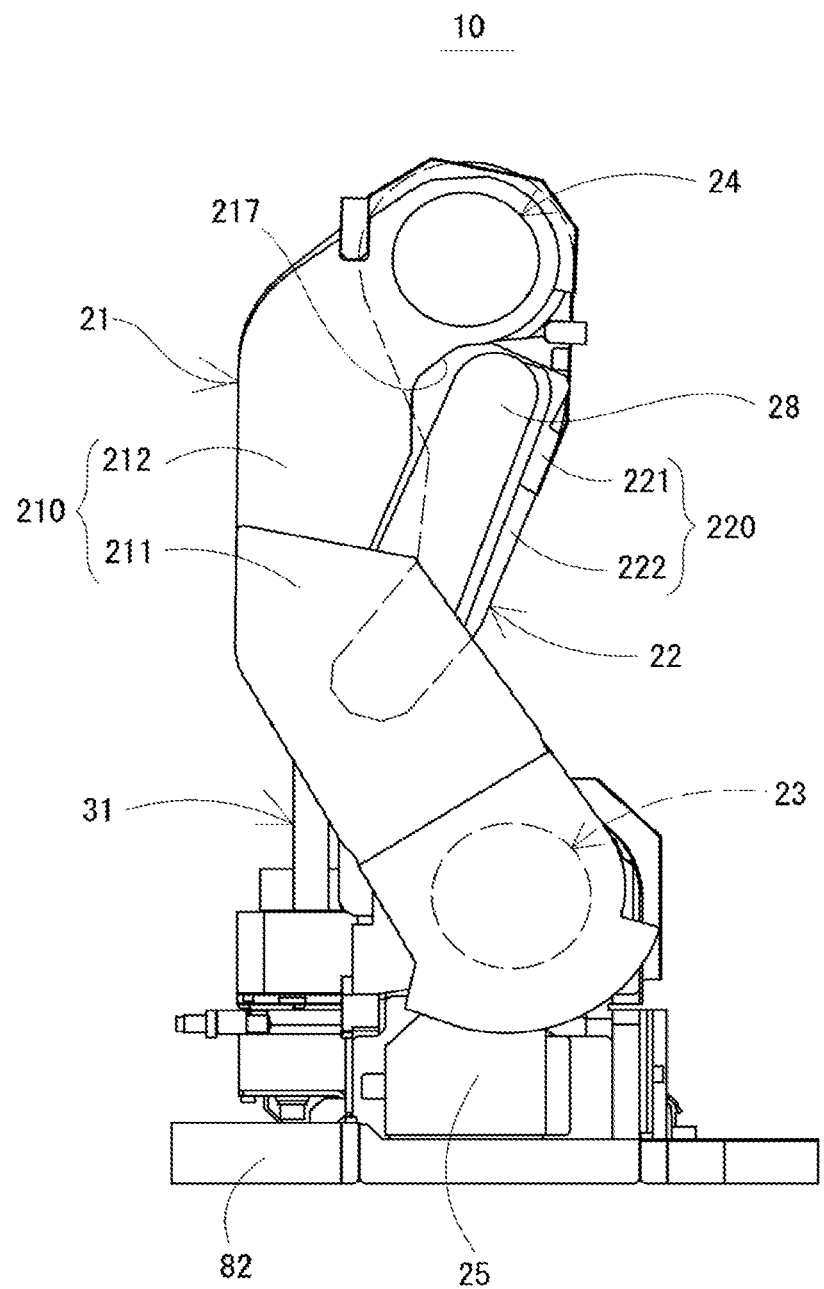
FIG. 4 is a side view showing a multi-joint robot arm in a folded state.
Figure 5:
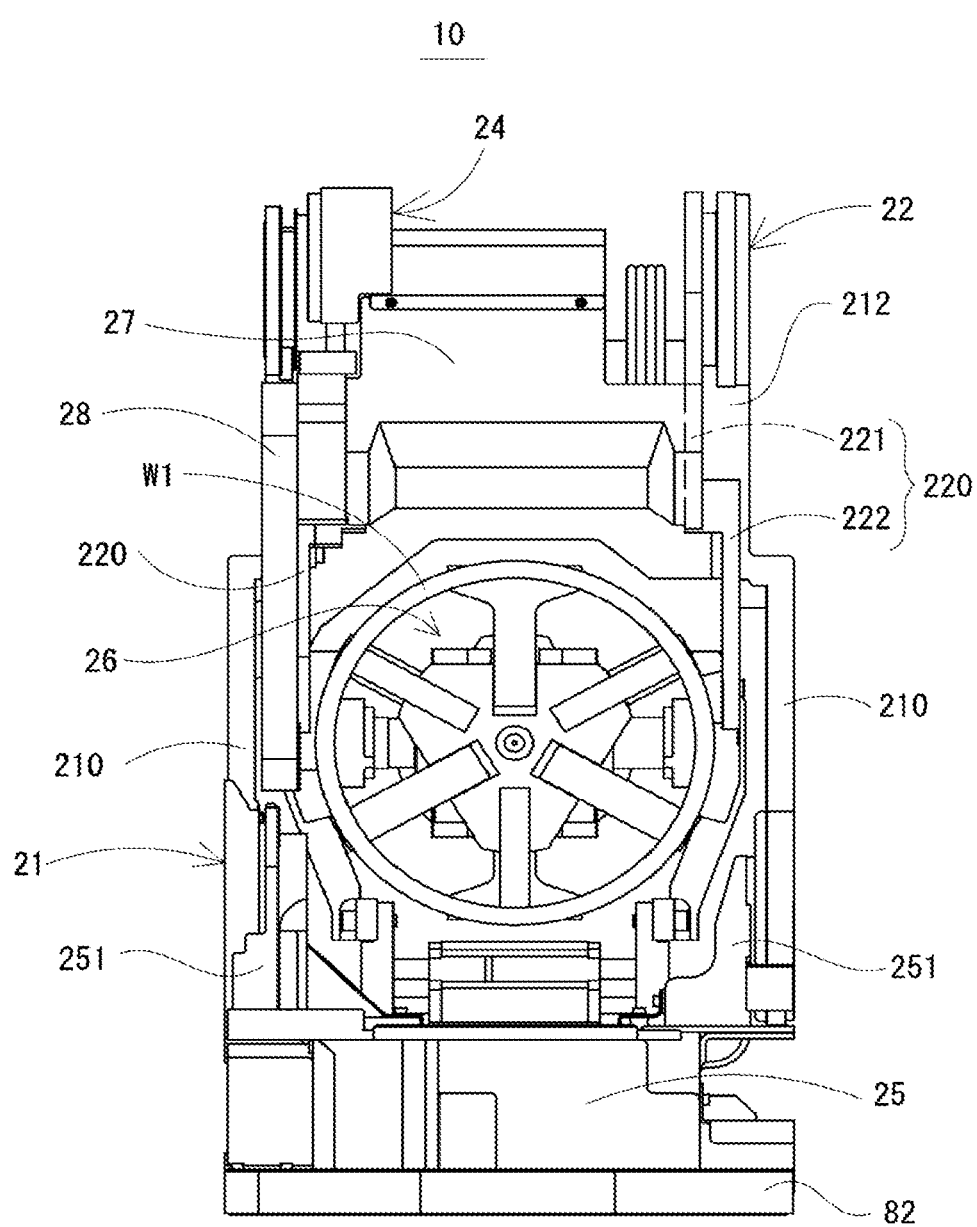
FIG. 5 is a front view showing a multi-joint robot arm in a folded state.
Figure 6:
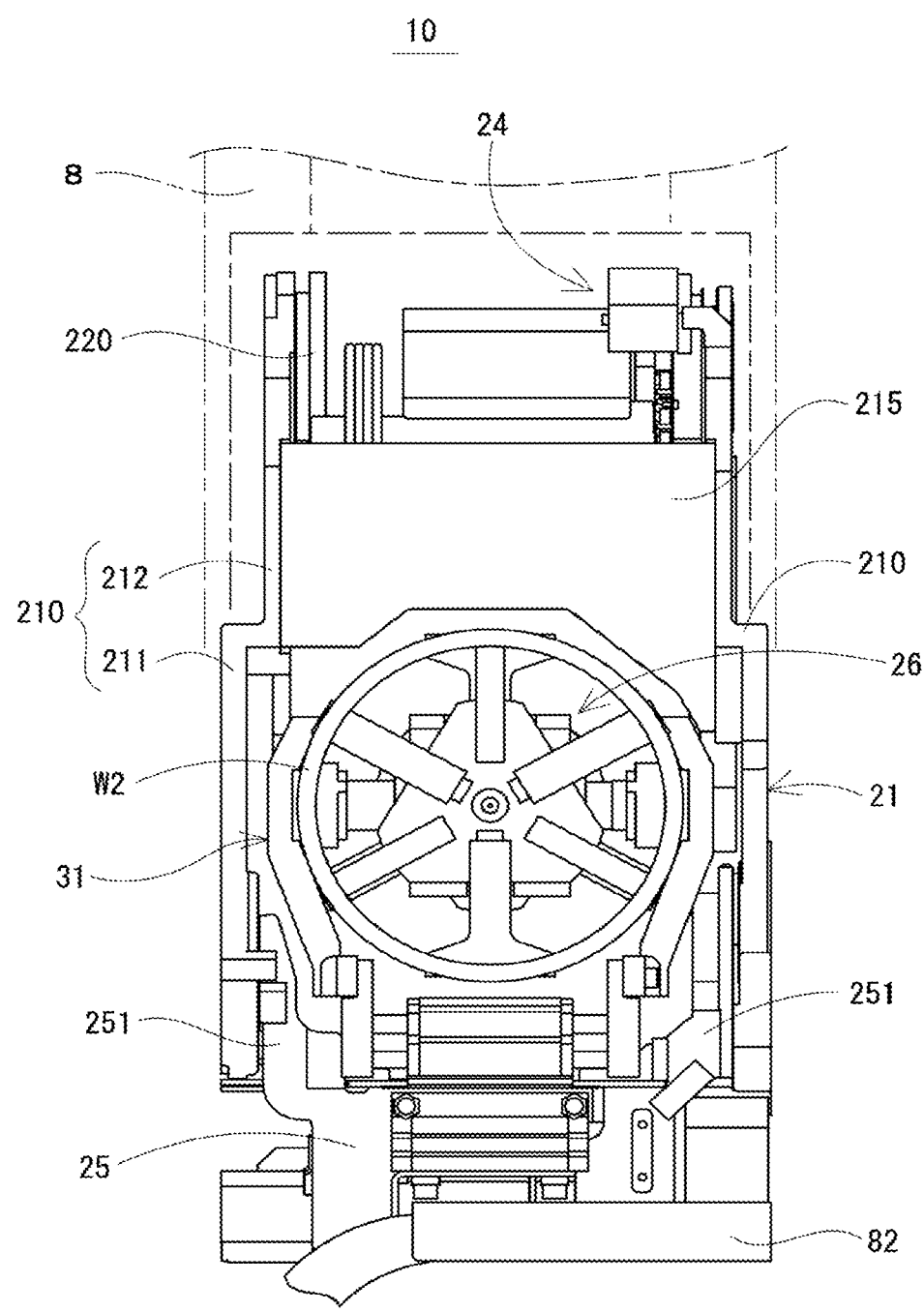
FIG. 6 is a rear view showing a multi-joint robot arm in a folded state.

FIGS. 2 and 3 are perspective views of a multi-joint robot arm that configures the automatic workpiece transfer machine in an extended state. FIG. 4 is a side view showing the multi-joint robot arm in a folded state. FIG. 5 is a front view (right side of FIG. 4) showing multi-joint robot arm 10 in a folded state; FIG. 6 is a rear view showing multi-joint robot arm 10 in a folded state. Multi-joint robot arm 10 can be moved inside the conveyance space inside front cover 7 in the folded state shown in FIG. 4, and can transfer a workpiece between processing modules 5 by extending as shown in FIGS. 2 and 3.

In FIGS. 2 and 3, a state is shown in which multi-joint robot arm 10 has entered inside front frame 8 of processing module 5. Front frame 8 is an internal cover of processing module 5. That is, processing module 5 is provided with a main shaft chuck that rotatably holds a workpiece, a turret device provided with tools, and the like inside the internal cover, and the internal cover forms a processing chamber. Accordingly, a state is shown with multi-joint robot arm 10 entered in front frame 8 during transfer of a workpiece with the main shaft chuck.

As described above, processing module 5 is configured to be compact with a small width dimension, which means that transfer opening 801 of front frame 8 is narrow. However, with processing module 5, to perform processing of a workpiece that is relatively large compared with the machine body size, it is necessary for multi-joint robot arm 10 to be capable of passing through a narrow opening to transfer a large workpiece to the far side of the processing chamber. For example, with the present embodiment, the machine body width of processing module 5 is 450 mm, and the diameter of a workpiece to be transferred by multi-joint robot arm 10 is 300 mm, with respect to a width of transfer opening 801 of around 370 mm.

The automatic workpiece transfer machine of processing machine line 1 is multi-joint robot arm 10 loaded on a traveling device. The traveling device is assembled to a front section of base inside cover 7. That is, a rack and rail are fixed to a front section of base 2 in a horizontal direction, and a traveling motor that rotates a pinion that engages with a slider or rack that is slidably held by the rail is provided on traveling body 80. Thus, the pinion rack rotated by the driving of the traveling motor rolls such that traveling body 80 moves along the rails along the front section of base 2. That is, multi-joint robot arm 10 is able to move inside the conveyance space inside cover 7.

Multi-joint robot arm 10 is loaded on traveling body 80 via rotation table 82. Multi-joint robot arm 10 is configured with support table 25 that is fixed to rotation table 82, with first arm 21 connected to support table 25 via first joint mechanism 23, and second arm 22 connected to first arm 21 via second joint mechanism 24. Support table 25 is configured with a pair of horizontal support sections 251 separated by a specified distance; a first arm 21 is configured from a pair of parallel first side plate members 210 arranged with a gap corresponding to the support sections 251. Accordingly, first side plate members 210 are connected support sections 251 via a joint shaft, and the angle of first arm 21 is adjusted by the driving of first joint mechanism 23.

First arm 21 is configured with a space between the pair of first side plate members 210, and second arm 22 is assembled inside these first side plate members 210. Second arm 22 is configured from a pair of parallel left and right second side plate members 220, with the second side plate members 220 and the first side plate members 210 being connected by a joint shaft. Accordingly, for second arm 22, angle adjustment with respect to first arm 21 is performed by the driving of second joint mechanism 24. Further, multi-joint robot arm 10 is configured with robot hand 26 attached to the free end of second arm 22 that forms a tip section.

Robot hand 26 is configured from a pair of chuck devices assembled to face each other so as to be able to grasp two workpieces, W1 and W2, as shown in the figure. Robot hand 26 is rotatably attached between second side plate members 220 via a shaft receiving member, such that adjustment of the position and angle of the pair of chuck devices is possible. Robot hand 26 is configured from chuck devices capable of grasping workpieces W1 and W2 that have a large diameter with respect to transfer opening 801 with a narrow width of processing module 5 as described above. Here, multi-joint robot arm 10 is configured to allow first arm 21 and second arm 22 that support robot hand 26 to enter inside a narrow opening.

Multi-joint robot arm 10 is formed such that the width of first arm 21 connected to support table 25 is roughly the same size as the width dimension of processing module 5. That is, the pair of left and right first side plate members 210 that configure the first arm 21 are, as shown in FIG. 6, arranged with a gap almost the same as the width of front frame 8. However, first arm 21 is formed with a level difference such that the width dimension varies, and when viewed in a lengthwise direction (vertical direction in FIG. 6), the gap on the support table 25 side is large, and the gap on the second arm 22 is narrow. In other words, the pair of first side plate members 210 form first wide section 211 and first narrow section 212 due to the level difference, and first arm 21 is configured such that first side plate members 210 are arranged symmetrically and are connected as one body via rear plate 215.

Accordingly, when viewing multi-joint robot arm 10 from the rear as shown in FIG. 6, with first arm 21, a portion of first wide section 211 overlaps front frame 8, but a portion of first wide section 212 is narrower than the width of transfer opening 801. Thus, multi-joint robot arm 10 is configured such that, in an extended state shown in FIGS. 2 and 3, first narrow section 212 of first arm 21 can enter inside processing module 5 (front frame 8).

Also, second arm 22 that is assembled inside first arm 21, similar to first arm 21, is formed with a level difference such that the width dimension changes. With second arm 22, the pair of left and right second side plate members 220 are connected symmetrically to form one body by a beam member. Second side plate members 220 are formed with a level difference between second narrow section 221 on the first arm 21 side and second wide section 222 on the free end. Thus, with second arm 22, when viewed in a lengthwise direction (vertical direction in FIG. 5), the width at the first arm 21 side is narrow, and the width at the free end (the tip end of multi-joint robot arm 10) is wide.

When viewing multi-joint robot arm 10 from the front as shown in FIG. 5, second arm 22 spreads out to a position such that a portion of second wide section 222 overlaps a portion of first narrow section 212 of first arm 21. Further, with multi-joint robot arm 10, robot hand 26 capable of grasping workpieces W1 and W2 with a large diameter is assembled to the pair of second narrow sections 221 spread to that width. In this manner, second arm 22 spreads from a portion with second narrow sections 221 that are narrow to a portion with second wide sections 222, thus enabling assembly of robot hand 26 that can grasp workpieces with a large size.

However, when multi-joint robot arm 10 is folded as shown in FIG. 4, first arm 21 is in an upright posture, and second arm 22 is pointing down, with a portion of second arm 22 inside first arm 21. Multi-joint robot arm 10, by changing to this compact state, is able to move inside the narrow conveyance space inside front cover 7. However, by being folded up in a compact manner, configuration members overlap each other, so it is necessary to ensure that such members do not interfere with each other. For example, in the present embodiment, positional relationships are such that second wide sections 222 of second arm 22 overlap with first narrow sections 212 of first arm 21, thus, there is a problem that interference occurs with a drive transmission section for driving robot hand 26.

Robot hand 26 has a hand motor positioned hidden in cover plate 27 shown in FIG. 5, and is fixed to second arm 22. The rotation output of the hand motor is transmitted to a rotation shaft of robot hand 26 via a pulley or belt, such that adjustment is performed to the orientation of robot hand 26 with respect to second arm 22. In the figures, the pulley or belt is inside cover case 28. Here, because cover case 28 is attached to second narrow section 221 of second arm 22, initially, if multi-joint robot arm 10 is folded, there is a problem of interference with first narrow sections 212 of first arm 21.

Thus, with the present embodiment, to solve this problem, escape section 217, which is a cutout, is formed in first side plate members 210 of first arm 21 to prevent interference with cover case 28. Normally, a member corresponding to first arm 21 is formed to connect first joint mechanism 23 and second joint mechanism 24 in a straight line. However, multi-joint robot arm 10 is formed from first and second side plate members 210 and 220 with a level difference and cover case 28 that will interfere due to those level-difference shapes, such that first arm 21 is formed into a bent curve shape that bends to the rear side as shown in FIG. 4.

Accordingly, with the present embodiment, the side surface shape of first arm 21 is bent to the left side in FIG. 4 compared to a line that directly connects first joint mechanism 23 and second joint mechanism 24, and multi-joint robot arm 10 has a shape that sticks out to the rear side. However, with multi-joint robot arm 10 having this shape, a separate problem occurs. With processing machine line 1, the conveyance space inside front cover 7 is narrow, so multi-joint robot arm 10 and front cover 7 are extremely close. Therefore, multi-joint robot arm 10 cannot lean any further to the rear side (left side in FIG. 4) adjacent to front cover 7 than the upright posture shown in FIG. 4. In other words, the state shown in FIG. 4 is just about the angle limit for multi-joint robot arm 10 to tilt to the rear side.

However, multi-joint robot arm 10 is provided with inverting device 31 that flips the workpiece to the rear side. Thus, if first arm 21 cannot tilt to the inverting device 31 side, that is, the rear side, robot hand 26 cannot get close to inverting device 31, and it is not possible to transfer workpiece W2. Thus, the rear side shape of second arm 22, although conventionally formed in a straight line, is formed with a bent shape so as to bend to the front side, that is, the processing module 5 side, which is opposite to first arm 21. Accordingly, second arm 22 is configured such that the free end is positioned to the rear side in a state folded and hanging down from second joint mechanism 24, and robot hand 26 is close to a position at which transfer of the workpiece is possible with inverting device 31.

Therefore, multi-joint robot arm 10 of the present embodiment is configured such that first arm 21 and second arm 22 have level differences, which allows loading of a robot hand 26 capable of grasping a workpiece with a large diameter while allowing multi-joint robot arm 10 to enter through narrow transfer opening 801. Specifically, while a portion of first narrow section 212 of first arm 21 enters into front frame 8, by the width spreading due to second wide section 222 of second arm 22, it is possible to load robot hand 26 that can grasp a workpiece with a large diameter. Also, multi-joint robot arm 10 is capable of performing transfer of a relatively large workpiece with respect to compact processing modules 5.

Also, multi-joint robot arm 10, by having escape section 217 formed in first side plate members 210 to prevent members from interfering with each other on the one hand, and by having first side plate members 210 formed in a curve bent towards the rear side, the rigidity can be maintained by having the wide of first side plate members 210 spread out. Further, with second arm 22, by having second side plate members 220 being formed in a shape bent in the same way, robot hand 26 is able to transfer work to and from inverting device 31.

The above describes an embodiment of the present disclosure, but embodiments are not limited to these and various changes may be employed without departing from the scope of the disclosure. For example, in an embodiment above, the machine body width of processing module 5, the size of transfer opening 801, and the diameter of the workpiece are shown with specific values, but these are merely examples.

REFERENCE SIGNS LIST

1: processing machine line; 5: processing module; 7: front cover; 8: front frame; 10: multi-joint robot arm; 21: first arm; 22: second arm; 23: first joint mechanism; 24: second joint mechanism; 25: support table; 26: robot hand; 210: first side plate member; 211: first wide section; 212: first narrow section; 217: escape section; 220: second side plate member; 221: second narrow section; 222: second wide section; 801: conveyance opening

The invention claimed is:

1. A multi-joint robot arm comprising:
a pair of support sections provided on a base member and separated by a specified gap in a width direction;
a first arm rotatably supported by a first joint on the pair of support sections and formed from a pair of first side plate members with a level difference such that a gap between the first joint and an end section on an opposite side becomes narrower towards the width direction side;
a second arm arranged inside of the pair of first side plate members, the second arm including a pair of second side plate members rotatably supported by a second joint on the first side plate members, and provided with a level difference such that a gap between the second joint and an end section on the opposite side gets wider towards the width direction side; and
a robot hand attached to the second arm on an end portion on the opposite side to the second joint, wherein
a portion of the pair of second side plate members is configured to enter inside the portion for which the gap in the width direction between the pair of first side plate members is wide.

2. A multi-joint robot arm comprising:
a pair of support sections provided on a base member and separated by a specified gap in a width direction;
a first arm rotatably supported by a first joint on the pair of support sections and formed from a pair of first side plate members with a level difference such that a gap between the first joint and an end section on an opposite side becomes narrower towards the width direction side;

a second arm arranged inside of the pair of first side plate members, the second arm including a pair of second side plate members rotatably supported by a second joint on the first side plate members, and provided with a level difference such that a gap between the second joint and an end section on the opposite side gets wider towards the width direction side; and a robot hand attached to the second arm on an end portion on the opposite side to the second joint, wherein the multi-joint robot arm is assembled such that a portion for which the gap in the width direction between the pair of first side plate members is narrow, and a portion for which the gap in the width direction between the pair of second side plate members is wide, are at overlapping positions when seen from a direction in which second side plate members oscillate by the second joint.

3. The multi-joint robot arm according to claim 1, wherein the first arm and the second arm, when seen from a sideways direction along an axis direction of parallel joint axes of the first joint and the second joint, respectively form a bent shape.

\* \* \* \* \*